April 6, 1965   B. AMIET ETAL   3,177,098
DEFERRED-ACTION BATTERY
Filed Feb. 13, 1961
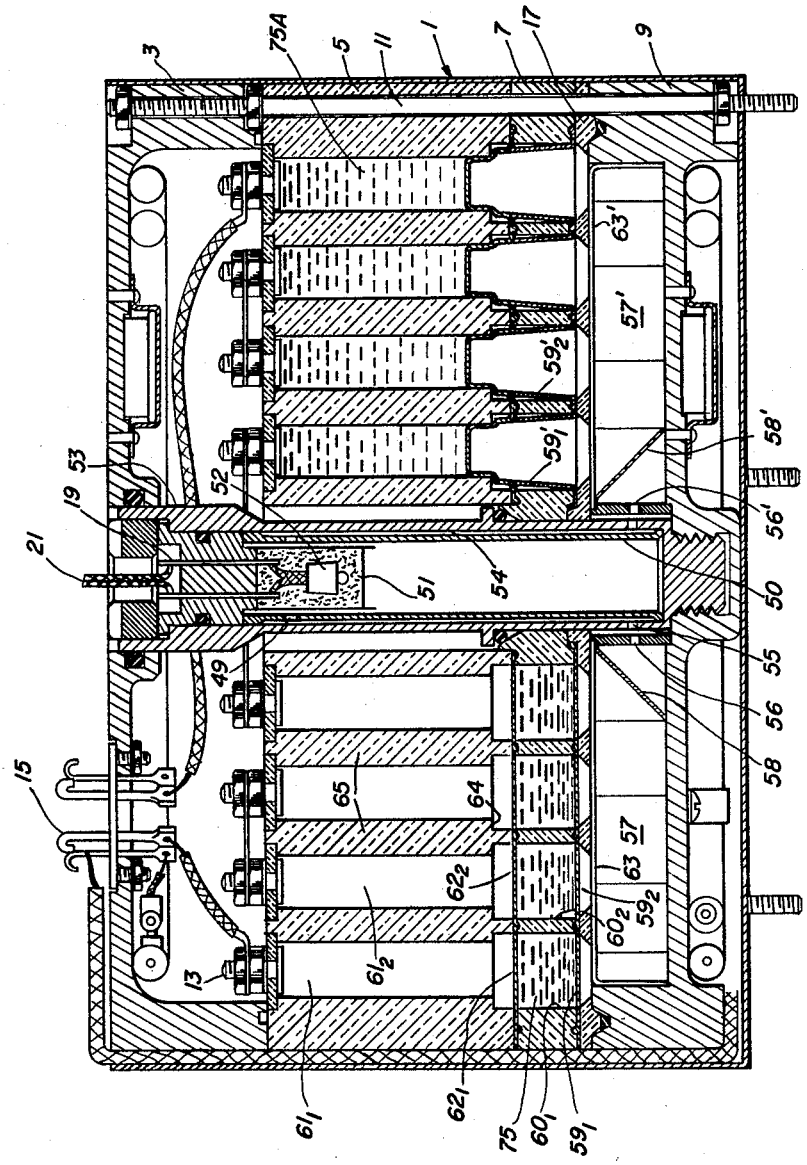
INVENTORS:
BERNARD AMIET
PIERRE LANGELLA
CHRISTIAN SENTENAC
BY
ATTORNEY

3,177,098
DEFERRED-ACTION BATTERY

Bernard Amiet, Ville-d'Avray, Pierre Langella, Harly-le-Ris, and Christian Sentenac, Mantes-la-Ville, France, assignors to Yardney International Corp., New York, N.Y., a corporation of New York
Filed Feb. 13, 1961, Ser. No. 88,863
Claims priority, application France, Feb. 16, 1960, 818,614, Patent 1,199,072
4 Claims. (Cl. 136—90)

This invention relates to deferred-action batteries of the type having means for activating the battery cells before use by the introduction of electrolyte into compartments containing the electrodes. More particularly, the present invention relates to a deferred-action battery wherein a plurality of cells are arranged in side-by-side relationship and wherein all of the cells are activated by a common activating mechanism which comprises, preferably, an explosive cartridge.

It is an object of the present invention to provide an improved deferred-action battery of the above-mentioned type wherein the use of spikes, knives or the like, conventionally employed to rupture a frangible membrane, is avoided. In a battery according to our invention each cell is activated by gas pressure through deformation of a soft flexible diaphragm which pushes the electrolyte, maintained in several reservoirs that are separated from the cells by frangible membranes, against these membranes whereby the latter are ruptured and electrolyte is caused to enter said cells. The flexible diaphragm is sufficiently distensible to penetrate into the electrode compartments of the cells, past the ruptured membranes, to insure positive displacement of all the electrolyte from each reservoir into the adjoining cell.

Other and more detailed objects will be apparent from the following description and the accompanying drawing whose sole figure is a cross-sectional view of an activator embodying the present invention, the left side of the figure showing a set of associated battery cells in their non-activated condition, the right side of the figure showing other battery cells in their activated condition.

As shown in the drawing, the battery comprises a housing 1 made of a top section 3, an upper intermediate section 5, a lower intermediate section 7, and a bottom section 9. The sections are held together by bolts 11 only one of which is shown.

Disposed within housing 1 are a plurality of vertically extended electrode compartments $61_1$, $61_2$, etc. in which are contained the electrodes (not shown). Each electrode compartment $61_1$ etc. is provided with electrode terminals 13 which are electrically connected to the electrodes and to the external battery terminals 15.

Arranged underneath and adjacent to each electrode compartment $61_1$ etc. is an electrolyte reservoir $60_1$, $60_2$, etc. Each electrolyte reservoir is bounded above by a rupturable membrane $62_1$, $62_2$, etc. and below by deformable membranes $59_1$, $59_2$, $59'_1$, $59'_2$, etc. Rupturable diaphragms $62_1$, $62_2$, etc. are in fact a single diaphragm which stretches across the openings of the electrolyte reservoirs $60_1$, $60_2$, etc. This diaphragm is held in position by sections 5 and 7 of housing 1.

Similarly, deformable elements $59_1$, $59_2$ or $59'_1$, $59'_2$ are diaphragms which stretch across the lower region of the electrolyte reservoir and are held in position by a shoulder 17 of bottom section 9 cooperating with the lower intermediate section 7 of the housing.

Arranged below diaphragms $59_1$, $59_2$ and $59'_1$, $59'_2$ etc. are grids 63 and 63', respectively, which may be made of any suitable material, e.g. perforated metal, cloth, glass fiber or other screening material. These grids form a perforated roof for gas-distributing chambers 57 and 57'.

Adjacent the inner ends of gas-distributing chambers 57 and 57', there are provided open-work deflectors 58 and 58' which deflect and cool gases injected into distributors 57 and 57' through openings 56 and 56' in a manner described in more detail below.

Located in the center of the battery housing 1 is a central casing 50 having an explosive powder charge 51 disposed near its upper end, this charge constituting a source of releasable gas under pressure. Immersed in the powder charge 51 is an electrical detonator 52 which is connected to a source of electricity by means of connectors 19 and wires 21.

Casing 50 is provided at its upper end with openings 49 and is surrounded by a well 53 which forms a narrow channel 54 for the conveyance of gases. Well 53 has near its lower end openings 55 which face openings 56 and 56' of gas-distribution chambers 57 and 57' described above.

To activate the battery, electric current is fed to electrical detonator 52 which sets off the powder charge 51. The gases generated thereby pass out through openings 49 of central casing 50 and down through channel 54 while being cooled during this passage. The gases leave channel 54 through opening 55 and pass into gas distributors 57 and 57' by means of openings 56 and 56', respectively, at which time they contact deflectors 58 and 58' and are further cooled.

The gases in distributors 57 and 57' rise through grids 63 and 63' and are further cooled, thereupon exerting pressure upon the deformable diaphragms $59_1$, $59_2$ and $59'_1$, $59'_2$, etc. respectively. The pressure generated is thus brought to bear on electrolyte 75 contained in reservoirs $60_1$, $60_2$, etc. This causes the rupture of frangible membranes $62_1$, $62_2$ etc.. which are parallel to the diaphragms $59_1$, $59_2$ etc., thus placed under gas pressure and the electrolyte is pushed up into position 75A in electrode compartments $61_1$, $61_2$, etc. as shown at the right side of the figure. The battery is thus activated. In this final condition of the battery the deformable membranes $59'_1$ and $59'_2$ form the bottom of the electrode compartments $61'_1$ and $61'_2$ in place of the diaphragm portions $62_1$ etc. by coming to rest against shoulders 64 near the lower ends of partitions 65 which separate the cell compartments $61_1$ etc. from one another. The shoulders 64 are formed by a recessed portion of the parallel vertical walls 65 which extends below the membranes $62_1$, $62_2$ etc. so that the width of each reservoir $60_1$, $60_2$ etc. equals that of the bottom portion of the adjacent compartment $61_1$ $61_2$ etc. below these shoulders.

Any suitable rupturable material may be used in the construction of the rupturable membranes $62_1$, $62_2$, e.g. Teflon or Kel–F. Any suitable flexible and distensible material may be used to make diaphragms $59_1$, $59_2$ or $59'_1$, $59'_2$ etc. Synthetic and natural rubber membranes could be used for this purpose.

A variety of combustible powder mixtures may be used for charge 51. Advantageously a powder is employed where combustion progresses slowly over a relatively long period of time until sufficient gas pressure is built up to deform the membranes $59_1$, $59_2$, $59'_1$ and $59'_2$. Powdered fuels which are utilized in rockets and fuses are examples of suitable fuels.

Numerous modifications of the disclosed embodiment can be made without departing from the spirit and scope of the invention and it is to be understood that the same is not be limited except as set forth in the appended claims.

What is claimed is:

1. In a deferred-action battery, in combination, an electrode compartment; an electrolyte reservoir adjacent said electrode compartment, said reservoir being bounded on one side by a frangible membrane separating it from said electrode compartment and on an opposite side by a deformable diaphragm substantially parallel to said membrane, said membrane constituting the sole barrier between said reservoir and said electrode compartment; a pressure chamber adjoining said diaphragm; and a source of releasable gas under pressure communicating with said chamber, said diaphragm being sufficiently distensible under pressure of gas from said source in said chamber to flex into said electrode compartment following rupture of said membrane under pressure of an electrolyte in said reservoir upon release of said gas whereby said electrolyte is forced into said electrode compartment by the gas pressure deforming said membrane.

2. In a deferred-action battery, in combination, an electrode compartment; an electrolyte reservoir adjacent said electrode compartment, said reservoir being bounded on one side by a frangible membrane separating it from said electrode compartment and on an opposite side by a deformable diaphragm substantially parallel to said membrane, said membrane constituting the sole barrier between said reservoir and said electrode compartment, said electrode compartment being provided with a pair of parallel walls perpendicular to said membrane and recessed just ahead of said membrane to form a pair of shoulders facing said reservoir, the recessed walls extending beyond said membrane to define two further sides of said reservoir whereby the latter has the same width as the adjacent portion of said electrode compartment; a pressure chamber adjoining said diaphragm; and a source of releasable gas under pressure communicating with said chamber, said diaphragm being sufficiently distensible under pressure of gas from said source in said chamber to flex into contact with said shoulders and penetrate therebeyond into a narrowed portion of said electrode compartment following rupture of said membrane under pressure of an electrolyte in said reservoir upon release of said gas whereby said electrolyte is forced into said electrode compartment by the gas pressure deforming said membrane.

3. In a deferred-action battery, in combination, a plurality of electrode compartments; an electrolyte reservoir adjacent each electrode compartment, said reservoirs being each bounded on one side by a frangible membrane separating it from the associated electrode compartment and on an opposite side by a deformable diaphragm substantially parallel to said membrane, said membrane constituting the sole barrier between said reservoirs and said electrode compartments; a pressure chamber common to all said reservoirs adjoining said diaphragms; and a source of releasable gas under pressure communicating with said chamber, said diaphragms being sufficiently distensible under pressure of gas from said source in said chamber to flex into each electrode compartment following rupture of said membranes under pressure of an electrolyte in each reservoir upon release of said gas whereby said electrolyte is forced into said electrode compartments by the gas pressure deforming said membranes.

4. In a deferred-action battery, in combination, a plurality of electrode compartments; an electrolyte reservoir adjacent each electrode compartment, said reservoirs being each bounded on one side by a frangible membrane separating it from the associated electrode compartment and on an opposite side by a deformable diaphragm substantially parallel to said membrane, said membrane constituting the sole barrier between said reservoirs and said electrode compartments, each electrode compartment being provided with a pair of parallel walls perpendicular to said membrane and recessed just ahead of said membrane to form a pair of shoulders facing the adjacent reservoir, the latter having a width substantially equal to that of the adjoining portion of the adjacent electrode compartment defined by the recessed walls; a pressure chamber common to all said reservoirs adjoining said diaphragms; and a source of releasable gas under pressure communicating with said chamber, said diaphragms being sufficiently distensible under pressure of gas from said source in said chamber to flex into contact with said shoulders and penetrate therebeyond into a narrowed portion of each electrode compartment following rupture of said membranes under pressure of an electrolyte in each reservoir upon release of said gas whereby said electrolyte is forced into said electrode compartments by the gas pressure deforming said membranes.

References Cited in the file of this patent

UNITED STATES PATENTS

| | | |
|---|---|---|
| 2,529,511 | Murphy | Nov. 14, 1950 |
| 2,829,188 | Coleman et al. | Apr. 1, 1958 |
| 2,905,741 | Smith et al. | Sept. 22, 1959 |
| 2,937,220 | Bauman | May 17, 1960 |